2 Sheets—Sheet 2.
R. R. PEDRICK.
Plow.
No. 221,095. Patented Oct. 28, 1879.
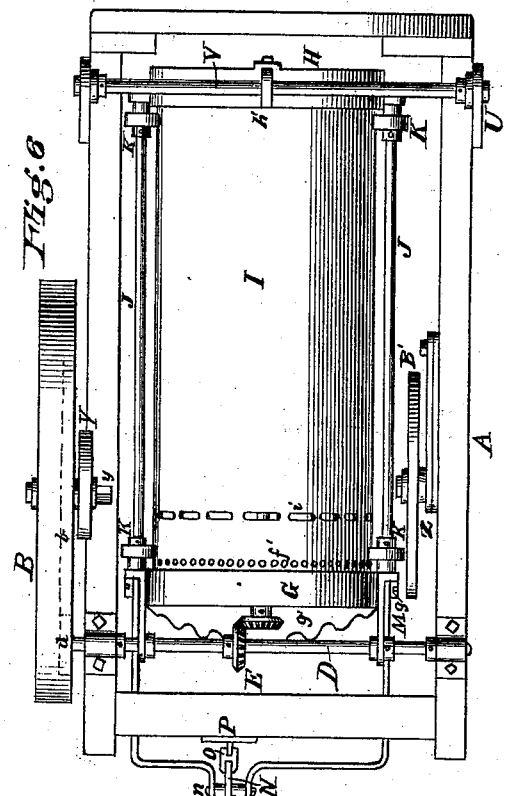
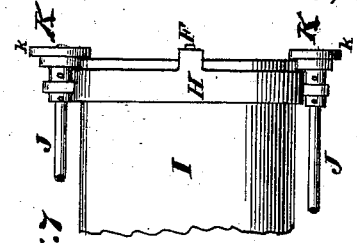
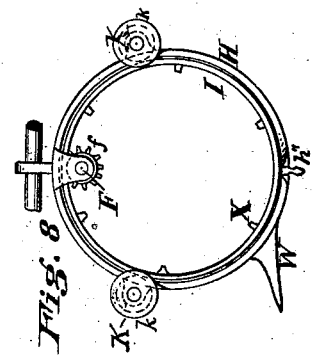
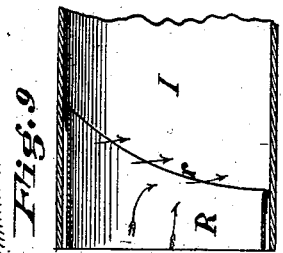
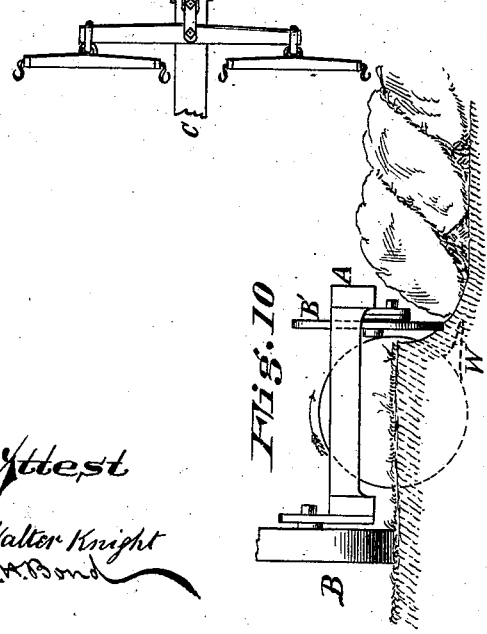
Inventor:
Richard R. Pedrick
By Knight Bros.
Att'ys
Attest
Walter Knight
E. K. Bond

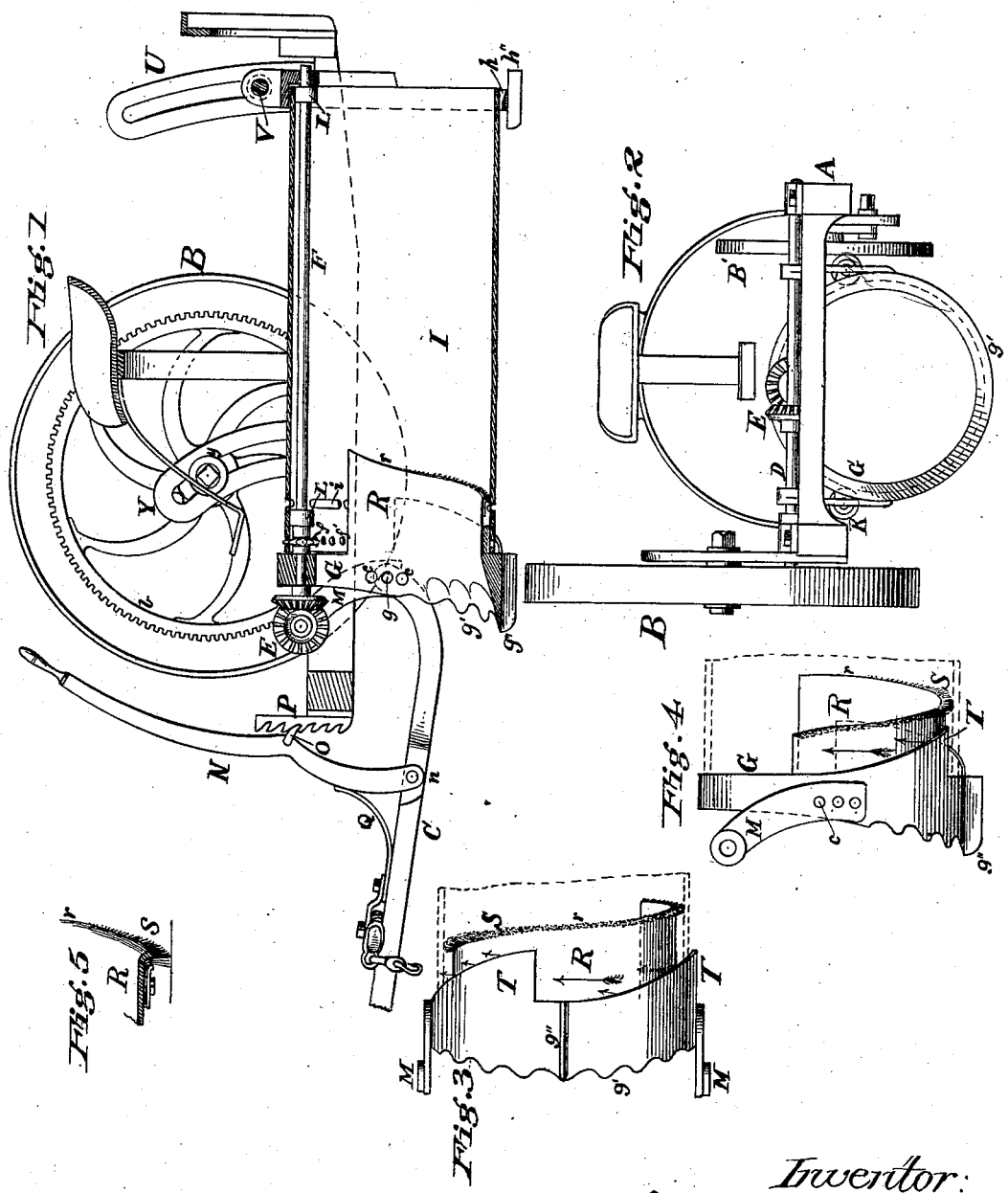

UNITED STATES PATENT OFFICE.

RICHARD R. PEDRICK, OF RICHMOND, INDIANA.

IMPROVEMENT IN PLOWS.

Specification forming part of Letters Patent No. 221,095, dated October 28, 1879; application filed March 25, 1879.

*To all whom it may concern:*

Be it known that I, RICHARD R. PEDRICK, of Richmond, Wayne county, Indiana, have invented certain new and useful Improvements in Plows, of which the following is a specification, reference being had to the accompanying drawings.

My invention is in the nature of a machine-plow, and hence may be called a "plowing-machine," and is designed for breaking and turning over the soil. It therefore relates more particularly to what are known as "breaking-plows."

The principal object of the invention may be best set forth by first stating the fact, well known among farmers, that it does not do to plow the ground when it is wet, on account of injuring the soil thereby. This difficulty the inventor conceives is inherent not in the wet state of the soil at such times, but mainly in the wedge-like shape and evident compressing action of the mold-board plow used. He therefore employs, instead of the usual mold-board, a device radically different, being a revolving horizontal tube of sufficient size, to which propelling machinery is applied by an actuating ground-wheel running upon the unplowed ground, by this means gradually turning over or twisting over the slice of soil during its passage through the tube, the previous operation of cutting the slice having been performed by a stationary cutter in front, of semicircular or other suitably approximate shape, and in diameter a little exceeding that of the tube, so that the latter will clear in passing.

By forming the plow so that its entire surface is horizontal to the slice of soil operated upon, or as nearly so as possible, and using driving machinery in connection therewith, great advantages are gained, certain imperfections found in the wedge-shaped mold-board plow being thereby largely obviated. To this end the cutter is made as thin as is practicable consistent with proper rigidity, the tube also being made strong, but light. In this way new working parts and simple machinery are designed in a plow so formed and operated as to do good work not only when the ground would be dry enough to allow of using a mold-board plow, but, additional to this, to permit plowing to go on with but little hinderance when the ground is considerably wet.

Having thus conceived and attained a new object in a plow, the inventor has so designed the implement as to have some secondary advantages also—viz., reducing to a minimum the pressure on the bottom and side of the furrow and a better breaking and loosening effect on the soil while in the act of turning over the slice without requiring therefor an increased expenditure of horse-power.

The cutter has a rearward extension telescoping loosely into the mouth of the tube, which extension is so lengthened in one side of the mouth, and shortened gradually toward the other side, as to present around the bottom and sides of the tube an oblique delivering-edge.

To provide for running the plow out of the ground at will, the tongue is so devised as to utilize the horse-power for this purpose.

Provision is made for the necessary vertical play of the plow proper with respect to its support, so as not to disconnect the machinery while it is running in and out of the ground.

In the accompanying drawings, Figure 1 represents a vertical section through the axis of the tube. Fig. 2 is a front view. Figs. 3 and 4 are, respectively, bottom and side views of my cutter and its accessories. Fig. 5 represents a detail of the cutter-lip. Fig. 6 is a plan view. Fig. 7 is a plan of the rear end of cylinder or tube. Fig. 8 is a rear elevation of tube. Fig. 9 is a horizontal axial section of the front of the tube, showing cutter-lip. Fig. 10 is a diagrammatical view, showing the operating effect of the plow.

A may represent any suitable frame supported on two ground-wheels, B and B', the frame being free to move on the axes of the wheels, except in so far as controlled by the tongue C.

A shaft, D, journaled across the fore part of the frame, is geared by pinion $d$ to the spur-wheel $b$ on the driving ground-wheel B, and, by means of bevels E, communicates the motion of the drive-wheel to the tube-shaft F, journaled in the front and rear collars, G and H.

Situated between the collars G and H, and supported upon rollers L on shaft F, is a cylindrical or similarly-shaped tube, I, which is caused to revolve by means of one or more pinions, $f$, engaging in holes $f'$ in the tube.

The front collar, G, and rear collar, H, are rigidly connected by tie-rods J on each side of the tube I, and upon which turn the rollers K, that serve to brace the tube and hold it securely in position.

The tube I, together with its frame G H J, swings or oscillates on the cross-shaft D by ears M, projecting from the front collar, G, and hung onto the cross-shaft D, immediately over the point of the plow.

The tongue C is pivoted to the collar G by pin $g$, and is adjustable thereon by means of two or more holes, $c$, in a similar manner and for the same purpose as the clevis adjustment of the common plow.

A lever, N, pivoted on the tongue at $n$, has a catch, O, engaging in rack P on the frame A, whereby the tongue and frame may be locked at any desired relative position. A spring, Q, may be used to hold the lever N against the rack P.

The lower half of the front collar, G, protrudes slightly forward, so as to form a share or cutter, $g'$, which is preferably made of the represented wavy form, so as to combine the advantages of a short share and gradual cut.

The cutter or collar G being somewhat larger in diameter than the tube I, for the purpose of securing sufficient clearance for the latter, the inner surface of the cutter is inclined upward and rearward, so as to elevate the soil the necessary distance before discharging it into the cylinder or tube.

In order to protect the joint between the cutter G and tube I, and for the additional purpose of throwing the soil onto the revolving tube at the proper angle to secure the breaking effect, I extend the lower half of the collar G rearward into the tube, forming a lip, R, and terminate it with an oblique edge, $r$, preferably somewhat curved, as shown in Fig. 9.

The obliquity of the edge $r$ to the direction of the plow is such that the soil in sliding into the revolving tube I from the stationary lip R will be carried off said lip at right angles to the edge $r$, tending to fracture the slice of soil and facilitate the revolution of the tube.

A brush, S, (see Fig. 5,) of wire, bristles, or other suitable material, extending the whole length of the edge $r$, prevents any access of dirt to the space between the lip R and the tube I, while slots $i$, extending around the cylinder immediately in rear of the gear-holes $f'$, afford ample means of exit should any chance to enter.

To prevent the gear-holes $f'$ and slots $i$ from having a contrary effect should there be any such tendency, they are guarded outside by suitably-shaped plates T, projecting rearwardly from the cutter-collar G, as shown in Fig. 3.

The placing of the triangular plates T is such that the tube I moves away from the angular side when in operation, tending to carry out the more readily any crumbs chancing to enter.

The collars G and H may be provided with keels $g''$ and $h''$ for increasing the steadiness of the plow; or, if desired, one keel extending the entire length of the plow may be used instead.

A cross-rod, V, attached to the top of the rear collar, H, at $h'$, and whose ends slide in suitable guides U on the rear end of the frame A, prevents any side motion of the rear end of the tube, while at the same time not interfering with the vertical play.

The bracing or retaining rollers K on the rear of the tie-rods J are preferably provided with flanges $k$, (see Figs. 7 and 8,) which, by projecting behind the rear edges of the tube, assist in retaining it in position.

The collar H is flared outward and rearward on the lower portion, $h$, so as to readily discharge any crumbs of soil chancing to get between it and the tube I.

A projecting tooth or breaker, W, (shown in Figs. 8 and 10,) extending from the side of the rear collar, H, serves to break up the small ridge left between the semicircular cuttings; or, if preferred, the cutter G may be made more nearly square in cross-section to accomplish the same purpose.

Horizontal ribs X (see Fig. 8) on the interior of the cylinder may be used for compelling the soil to rotate with the cylinder or tube farther than it otherwise would.

The driving ground-wheel B runs on the unplowed ground, and is adjustable about the shaft D as a center by means of slotted arm Y and clamp-bolt $y$, or other suitable contrivance, so as to accommodate the plow to different depths of furrow.

The idler ground-wheel B' may be adjusted vertically by a similar device, Z, and is made narrow-faced and placed close to the cylinder, in order that it may run on the ridge immediately next the plow, as seen in Fig. 10.

In place of the triangular guards T projecting from the cutter-collar G, an entire jacket may be used, inclosing all the tube except that portion working above ground, in which case it also will be provided with escape-holes.

The tubular member I may be slightly conical or bell-shaped inside, though in my preferred form it will be a plain cylinder, formed of thin sheet-steel, and stiffened with one or more cast-steel collars.

The cross-rod V, which is attached to the top of the rear collar, H, may be provided with automatically-operating catches, releasable by lever at will, so that the rear end of the tube may be locked at the necessary height to carry clear of the bottom of the furrow.

The driving-wheel B may be adjusted up and down by means of a lever and retaining-rack common to such devices, if desired.

Though intended as a walking-plow, a seat is provided for the use of the driver when preferred.

The inventor does not confine himself to any particular shape of the lip R, although preferring the oblique edge.

Two or more of the tubes I may be combined to form a gang-plow.

In the operation of the plow, the clevis attachment $c$ $c'$ to the cutter-collar G having been adjusted to depth, the lever N is used to lock the tongue at a proper degree of angle to the frame-work, so that when under the tension of draft the plow will have a downward tendency until it arrives at the proper working level, when any further downward motion would so change the line of draft as to cause a reversed tendency, effecting a return toward the working level, it moving thus in equilibrium at the desired depth.

In order to run the plow out of the ground, it is only necessary to release the lever N. The tongue C being then free to move on its pivot $g$, it is evident that the resultant motion of the frame and tongue will effect a straightening out between the same, causing the front end of the frame to ascend and run the plow out of the ground.

On entering the ground the semicircular cutter G severs from the mass a similarly-shaped slice of soil, which, sliding rearward along the lip R and into the mouth of the tube I, is drawn off sidewise by the revolving tube from the oblique edge $r$ of the lip R.

The course the soil takes through the tube is in a spiral or twisted direction, the degree of the twist and the consequent breaking effect desired depending on the speed used.

In the form preferred the tube is given a slow motion, and has proper length to accomplish the degree of inversion desired, effecting at the same time a moderate amount of breakage or loosening of the soil.

Owing to the straight rearward discharge and to its edge standing so as to cut at right angles to the line of travel, this plow runs steadily, without requiring handles or the labor of constant guiding.

Besides helping to steady the plow, this share, cutting squarely across, consumes less horse-power than the slanting-cut share of the mold-board plow, for the point of the latter, working, as it does, on the side farthest from the previous cut or break, and being necessarily long, has no side relief, owing to the edge of the share retreating backward.

The machinery may be so constructed as to permit changes in the degree of motion imparted to the tube, and the length of the tube may be accordingly varied by detachable sections, so as to accomplish the proper degree of inversion.

Besides turning over the soil, the additional effect of harrowing while the soil is fresh may be obtained by increasing the speed and shortening the tube accordingly.

This form of plow may be used as a cultivator also, having an advantage for this purpose, due to its rear delivery, of avoiding the throwing of soil upon young plants.

If, for some reason, a larger furrow be desired, the construction may be changed so as to permit of setting the tube obliquely to the line of travel.

The inventor does not confine himself to the specific driving mechanism shown, as any suitable means for that purpose may be advantageously used.

Having thus described my invention, I claim—

1. The revolving plow I, of tubular form, for encircling, operating upon, and rearwardly delivering the soil, substantially as described.

2. In a machine-plow, the combination of the cutter proper, $g'$, having plain or irregular edge for severing the slice of soil, and the revolving tube I for inverting the same.

3. In a machine-plow, a tube, I, and a cutter, $g'$, the latter being provided with a lip, R, projecting into the tube, as and for the purpose set forth.

4. In a machine-plow, the lip R, projecting rearwardly from the cutter G, and formed to present an edge, $r$, obliquely to the carrying part moving away therefrom, for the purposes of facilitating the revolution of the tube, decreasing compression, and increasing breaking effect.

5. The tube I and cutter proper, $g'$, the latter having a lip, R, projecting into the former, said lip being provided with a brush, S, radiating from the convex side of its rear edge, $r$, combined and operating as described.

6. The combination of the cutter $g'$, lip R, and tube I, having slots or escape-holes $i$, for the purpose set forth.

7. In a machine-plow, the fixed cutter G $g'$ and the revolving tube I, having gear-holes $f'$, in combination with shaft F and suitable gearing driven from the ground-wheel B, substantially as shown and described.

8. The tube I, having gear-holes $f'$ and escape-holes $i$, guarded by outside plates T, substantially as set forth.

9. The combination of the tube I and the cutter $g'$ with lip R and guards T.

10. The combination of the revolving tube I, fixed cutter G, collar H, tie-rods J, and rollers K, substantially as shown and described.

11. In a machine-plow, the tube-shaft F, collars G and H, and tie-rods J, substantially as described, and for the purpose of supporting and bracing the tube.

12. In a machine-plow, the drive-wheel B, gearing $b$ $d$, cross-shaft D, bevels E, tube-shaft F, and gearing $f$ $f'$, for revolving the tube I, substantially as set forth.

13. In a revolving plow, the ribs or guides X, or their equivalents, to prevent any tendency of the soil to slide sidewise.

14. The combination of tubular plow I and frame G H J, or its equivalent, and rollers K, provided with retaining-flanges $k$, as and for the purpose set forth.

15. In a revolving tubular plow, the tooth or breaker W, substantially as described, and for the purpose set forth.

16. In a revolving plow, the combination of tube I, rear collar, H, and tooth or breaker W, substantially as shown and described.

In testimony of which invention I hereunto set my hand.

RICHARD R. PEDRICK.

Attest:
 WALTER KNIGHT,
 L. H. BOND.